No. 772,511. PATENTED OCT. 18, 1904.
G. R. HISLOP.
MIXING AND DISTRIBUTING CHAMBER FOR GAS FIRED FURNACES.
APPLICATION FILED MAR. 2, 1904.
NO MODEL. 2 SHEETS—SHEET 1.
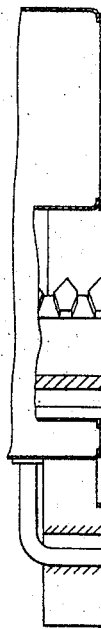
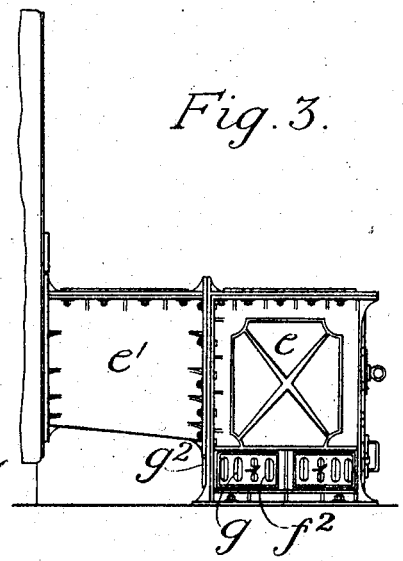
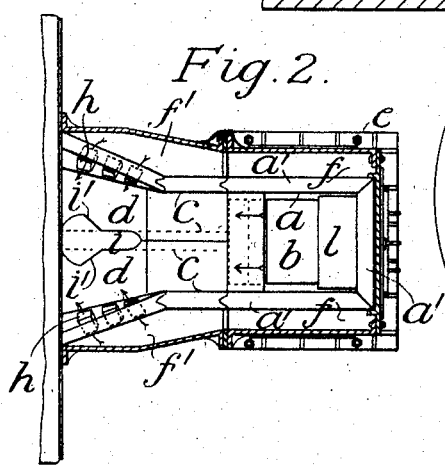
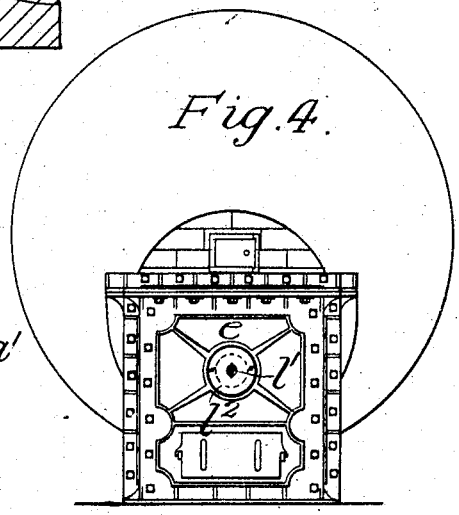
Witnesses.
Inventor
George Robertson Hislop
by B. Singer atty.

No. 772,511. PATENTED OCT. 18, 1904.
G. R. HISLOP.
MIXING AND DISTRIBUTING CHAMBER FOR GAS FIRED FURNACES.
APPLICATION FILED MAR. 2, 1904.
NO MODEL. 2 SHEETS—SHEET 2.
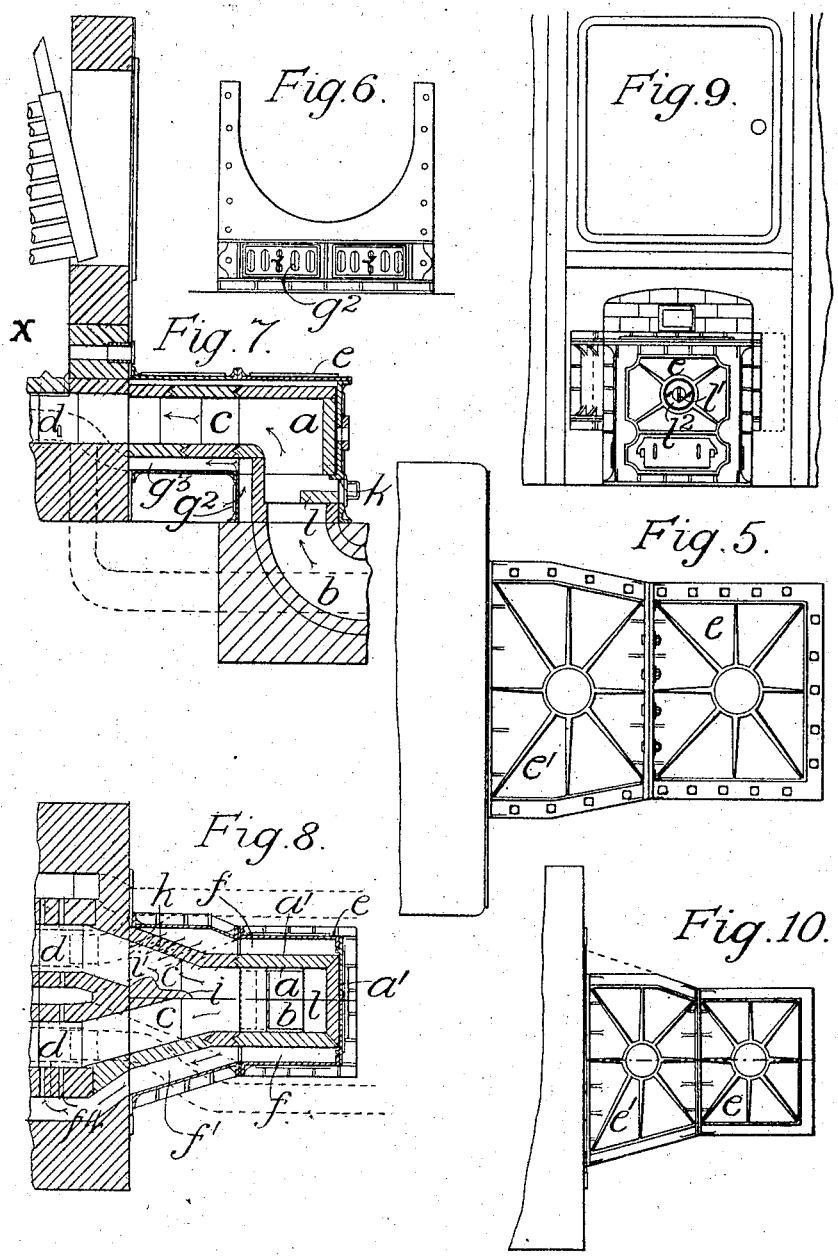
Witnesses. Inventor
George Robertson Hislop
by B. Singer atty No. 772,511. Patented October 18, 1904.

UNITED STATES PATENT OFFICE.

GEORGE ROBERTSON HISLOP, OF PAISLEY, SCOTLAND.

MIXING AND DISTRIBUTING CHAMBER FOR GAS-FIRED FURNACES.

SPECIFICATION forming part of Letters Patent No. 772,511, dated October 18, 1904.

Application filed March 2, 1904. Serial No. 196,176. (No model.)

*To all whom it may concern:*

Be it known that I, GEORGE ROBERTSON HISLOP, a subject of the King of the United Kingdom of Great Britain and Ireland, residing at the Gas Works, Paisley, Renfrewshire, Scotland, have invented certain new and useful Improvements in Mixing and Distributing Chambers for Gas-Fired Furnaces, of which the following is a specification.

This invention has for its object to provide in conjunction with steam-boiler and other furnaces a chamber or casing wherein gas from a producer or other source is received and mixed with heated air and delivered after admixture directly to the furnace-chamber in such manner that perfect combustion of the gas is insured.

The invention is illustrated in the accompanying drawings, in which—

Figure 1 is a longitudinal vertical section of the improved mixing-chamber as used in conjunction with a combustion-chamber within the flue of a cylindrical shell-boiler. Fig. 2 is a horizontal section of the same. Fig. 3 is a side elevation, Fig. 4 a front elevation, and Fig. 5 a plan, of the same, while Fig. 6 is an elevation of one of the inner end plates of the casing. Fig. 7 is a longitudinal vertical section, Fig. 8 a horizontal section, Fig. 9 a front elevation, and Fig. 10 a plan, showing a modification of the invention as applied to the combustion-chamber of a water-tube boiler.

As shown by the drawings, the apparatus comprises a double-cased chamber $a$, having side and end walls $a'$, composed of brick slabs or tilework and to whose lower end is connected a flue $b$, through which gas from a producer or other source is led into the chamber $a$, which opens up at one end into a passage $c$, leading into a gas and air mixing chamber or chambers $d$, which may be located under the furnace-chamber $x$ of the boiler, Fig. 7. The chamber $a$ is preferably made of rectangular form, its inclosing walls being conveniently made up of a number of slabs which are mitered and checked, as shown, to engage each other. Around this chamber an outer casing $e$, of iron-work, is formed, an air-space $f$ being left between the inner chamber and the iron casing along the side walls $a'$ of the former, the metallic casing being extended at $e'$, preferably in D form, around the walls of the flue-passage $c$, so as to leave a like air-space $f'$ around it. Air is introduced to the spaces $f f'$ at or near the floor-level through openings $f^2$, covered by sliding ventilator-plates $g$, or through like means for regulating the admission of the air-supply which enters and passes along the spaces $f f'$, absorbing heat from the walls $a'$ of the chamber $a$ and passage $c$, being thence directed through openings $h$ in the walls of the passage $c$ to meet and mingle with the gas passing through the flue or flues $c$ to the boiler-furnace, or said air may be led through the passages or flues $f'$ to alongside or under the mixing-chambers $d$, as shown at Fig. 8. By preference the main air-supply passes through the openings at $g$ around the sides of the chamber $a$, as described, and a separate supply is led in at $g^2$, thence through a passage $g^3$ to openings in the bridge in flue-boilers and to ports in the center wall between the combustion-chambers in tubular boilers, this supplementary air-supply being admitted through regulator-openings at $g^2$, Figs. 1, 3, and 6, on the side of the casing $e$ adjoining the boiler-front, and thence along the space $g^3$ at the under side of the flue $c$ to the hollow bridge or the combustion-chamber $x$.

In the middle of the flue-casing $c$ is placed a central brick or slab $i$ for the purpose of dividing the gas-supply into two streams, the slab being formed with inclined projections $i'$ to direct the gas into contact with the air entering the perforations $h$, so that the gas and air supply may be thoroughly commingled as it enters the boiler-furnace or the chamber or chambers $d$ in which ignition takes place.

On one side of the casing $e$, but preferably at the front thereof, a doorway $k$, equal in width to that of the gas-flue $b$, is provided and fitted with a suitable clay tile or damper $l$, which may be employed to regulate the volume of gas passing into the chamber $a$ or may be used to close off the flue $b$ completely when repairing the furnace or when the water-supply to the boiler is short.

The outer casing $e$ is suitably flanged to permit of bolting the parts together and of securing the box to the floor and provided with sight and cleaning openings $l'$ $l^2$, respectively.

What I claim, and desire to secure by Letters Patent of the United States, is—

1. In a gas-fired furnace, in combination, a chamber $a$ having side and end walls $a'$ of brick slabs, a flue $b$ leading gas to said chamber $a$, a gas and air mixing chamber $d$ under the furnace-chamber, a passage $c$ connecting said chambers $a$ and $d$, an iron casing $e$, $e'$ surrounding said chamber $a$ and said passage $c$, and leaving an air-space $f$, $f'$ between said casing $e$, $e'$ and said chamber $a$ and passage $c$, inlets $f^2$ admitting air to said spaces $f$, $f'$, ventilator-plates $g$, passages $h$ in the walls of said passage $c$, ports $f^4$ connecting the chamber $d$ and the spaces $f$, $f'$, a slab $i$ having inclined projections $i''$ in the middle of said passage $c$, supplemental air-inlets $g^2$ and a passage $g^3$ leading to the combustion-chamber, as shown and described.

2. In a gas-fired furnace, in combination, a chamber $a$ having side and end walls $a'$ of brick slabs, a flue $b$ leading gas to said chamber $a$, a damper $f$ for regulating passage of gas through said flue, a gas and air mixing chamber $d$ under the furnace-chamber, a passage $c$ connecting said chamber $a$ with said chamber $d$, an iron casing $e$, $e'$ surrounding said chamber $a$, and passage $c$ and leaving a space $f$, $f'$ between the walls of said casing the walls of said chamber $a$ and passage $c$, inlets $f^2$ admitting air to said spaces $f$, $f'$, ventilator-plates $g$, passages $h$ in the walls of said passage $c$, ports $f^4$ connecting the chamber $d$ and the spaces $f$, $f'$, a slab $i$ having inclined projections $i''$ in the middle of said passage $c$, supplemental air-inlets $g^2$, a passage $g^3$ leading to the combustion-chamber, and the door $k$ in said casing $e$, as shown and described.

In testimony whereof I have signed my name to this specification in the presence of two subscribing witnesses.

GEORGE ROBERTSON HISLOP.

Witnesses:
WALLACE FAIRWEATHER,
JNO. ARMSTRONG, Junr.